United States Patent [19]
Kozak et al.

[11] 3,898,883
[45] Aug. 12, 1975

[54] STATOR ASSEMBLY FOR FLOWMETERS AND THE LIKE

[75] Inventors: Zdenek Vaclav Kozak; Joseph Jaromir Stupecky, both of North Hollywood, Calif.

[73] Assignee: Zdenek Kozak, North Hollywood, Calif.

[22] Filed: May 18, 1973

[21] Appl. No.: 361,539

Related U.S. Application Data

[62] Division of Ser. No. 218,094, Jan. 17, 1972, Pat. No. 3,792,611.

[52] U.S. Cl. ............................................. 73/231 R
[51] Int. Cl. ............................................. G01f 1/10
[58] Field of Search .......... 73/231 R, 231 M, 194 B; 415/216, 210

[56] References Cited
UNITED STATES PATENTS

| | | | |
|---|---|---|---|
| 1,062,258 | 5/1913 | Schlotter | 415/210 |
| 2,915,238 | 12/1959 | Szydlowski | 415/181 |
| 3,036,460 | 5/1962 | White et al. | 73/231 R X |
| 3,302,926 | 2/1967 | Bobo | 415/216 |

*Primary Examiner*—James J. Gill
*Attorney, Agent, or Firm*—John E. Wagner

[57] ABSTRACT

A unidirectional flowmeter of the design having a central bore with a stator installed therein, and a rotor mounted axially in the bore. The stator is assembled from a plurality of helically curved vanes, each of them having a curved peripheral support mating the next vane in the stator assembly. These vanes, extend to the center of the bore, and form an enclosure for the upstream bearing housing. The stator introduces rotary motion into the flow of fluid through the meter body and thereby the rotor having two straight radial blades, is rotated.

In the event that reversed flow of fluid occurs, a bearing support column produces a wake in the flow of fluid within the meter body. The wake is separated from streamlined flow by a barrier of intensive vortices. These vortices causing the rotor to stop within the wake and align itself with the bearing support column. A photo-electronic pickup device is used to respond to the rotation of rotor and to indicate its position while being stopped.

5 Claims, 6 Drawing Figures

STATOR ASSEMBLY FOR FLOWMETERS AND THE LIKE

RELATED APPLICATIONS

This is a division of our copending application Ser. No. 218,094 filed Jan. 17, 1972 now U.S. Pat. No. 3,792,611.

UNIDIRECTIONAL FLOWMETER INDICATING CHANGES OF FLOW DIRECTION.

This invention relates to improvements in flowmeters of the type used for measuring the flow of fluids; such as clear gases, under bidirectional flow conditions with rapid changes of flow rate. A typical example of such flow conditions is in the medical field in respiratory measurements and anesthesiology where several different pulmonary functions are to be measured, preferably by one instrument. High sensitivity, low pressure drop and wide range of linearity are essential requirements for this type of application. Another required feature is ability to measure the flow rate only in one direction and to pass freely the fluid flowing through the flowmeter in reversed direction. Simultaneously, a positive indication of all flow direction changes is necessary.

Flowmeters of the design having a central bore wherein the fluid is set in spiral motion and the rotor, having a plurality of straight radial blades, follows the movement of the fluid, are exceptionally suitable for the above described conditions.

A known form of a flowmeter of this type has several disadvantages. During reversed flow of fluid through a known type of flowmeter, there is no specific movement or position of the rotor in relation to the pickup device, which could be used for positive indication of flow direction changes. Transmission of information from the rotor to the exterior is accomplished by a magnetic or electromechanical or simply mechanical pickup which imposes a drag on the rotor, giving rise to inaccuracies at low flow rate values. Another disadvantage is concerned with means for introducing the rotary motion into the fluid passing through the flowmeter. Two basic systems are known. One using a plurality of channels distributed evenly on the flowmeter bore periphery and delivering the fluid tangentially into the flowmeter bore. Main disadvantage of this system is a very complicated flow path with many obstructions resulting in an appreciably undesirable pressure drop. In the other system, the fluid enters the flowmeter bore axially and is set in rotary motion by a plurality of helically curved stator vanes. To ensure minimum pressure srop and to maintain uniform angular velocity of the swirling fluid all over the cross-section of the meter bore, the vanes must extend as close as possible to the center of the bore. The accuracy of the instrument depends to a substantial degree upon the quality of the stator vanes, both as to the geometrical shape and dimensional tolerances. Unless every single flowmeter is calibrated and adjusted individually, all the stators produced for the same size of the flowmeter should be identical. Another requirement is to provide means for precise mounting of the stator within the bore of the meter body. All those problems become extremely acute in flowmeters of small sizes. It has been difficult and often not economical to satisfy all the requirements for design and manufacturing of the stator. Usually, there has been a compromise between theoretical requirements and an acceptable way of manufacturing but always resulting in decreased performance of the flowmeter. One objective of the present invention is to provide an improved construction of the stator which may be produced in the required geometrical shape with very close tolerances at low production cost, and may be accurately mounted in the flowmeter body even by relatively unskilled labor. Another objective of the present invention is to provide means for stopping the rotor in a specific position whenever reversed flow of fluid through the flowmeter occurs, and a suitable pickup device to respond to the turning movement of the rotor and to indicate its position while being stopped.

The present invention may be described as a flowmeter of the type having a central bore with a stator installed therein and a rotor mounted in jewel bearings axially of the bore. The stator is assembled from a plurality of helically curved vanes, each of them having a curved peripheral support mating the next vane in the stator assembly. These supports form an enclosed cylindrical rim on the outer periphery of the stator assembly, said rim having outside diameter matching the diameter of the body bore and having end faces parallel to each other. The vanes extend to the center of the bore and form an enclosure for the upstream bearing housing which is thereby held accurately in a proper position. Also, the bearing housing functions as a hub for the stator assembly and locates the stator vanes tightly in the meter body in radial direction. A threaded retaining ring having an inside diameter matching the diameter of the throat bore is used to secure the stator in axial direction. Thus, the stator can be simply installed in the meter body by using minimum number of parts with assurance that proper orientation and accurate spacing of the stator vanes will be obtained even for relatively small sizes. The downstream bearing support is constituted by a column mounted in the center of the bore, and a set of straightening fins extending lengthwise thereof. Mounted between bearing supports axially of the bore, there is a rotor comprising a shaft and a low inertia impeller having two straight radial blades. These blades present a face axial to the bore. The fluid to be measured is set in spiral motion by the stator and thereby causing the rotor to rotate at a rate depending on fluid flow. In a preferred form, to reduce friction to a minimum the rotor is mounted in jewel bearings. Whenever reversed flow of fluid occurs and the fluid enters the flowmeter bore from the outlet side, the straightening fins direct the flow axially into the bore. Thus, there is no rotary motion within the fluid flow to drive the rotor. On the contrary, the axial flow of fluid effectively decelerates the rotor in case it is still rotating due to its own inertia. The rotor finally comes to full stop within a wake which is created in the flow of fluid by the bearing support column. The wake is separated from streamlined flow by a barrier of intensive vortices being shed alternately on either side of the bearing support column in a periodic fashion, their dynamic effects on the rotor being balanced when the rotor blades are located exactly in the center of the wake. More specifically, when the blades are aligned with the bearing support column. In the event that the rotor deviated from this position and impeller blades are located asymmetrically within the wake, the vortices create dynamic pressure acting on the blade faces in such a manner as to move the rotor back to the balanced position. Because vortex shedding is of a pulsating nature, a very slight flutter will appear on the rotor blades.

Vortex Shedding and Wake Forming is a Natural Phenomenon.

A commonly cited example in the dynamics of fluids is the flow aroung a circular cylinder whose axis is perpendicular to the flowstream. The trail of vortices on the downstream side of the cylinder is often referred to as the Karman vortex trail.

A photo-electronic pickup device is associated with the body to respond to the turning movement of the rotor and, or to indicate its position while being stopped by reversed flow. A light beam being directed into the bore parallel to the direction of the bearing support column is sensed by a phototransistor. When the rotor rotates, the impeller blades are interrupting the light beam aimed to the photo-transistor thereby generating in a circuitry associated therewith electrical pulses whose repetition rate depends on flow rate. Whenever the rotor is stopped by reversed flow, the impeller blades stand parallel to the light beam allowing the phototransistor to be fully illuminated. This causes the phototransistor to conduct a constant voltage signal for a period of reversed flow duration. In an alternate configuration, the light beam crosses the bore in direction perpendicular to the bearing support column. Whenever the rotor is stopped, the impeller blades prevent the light beam from reaching and activating the phototransistor. It means that in this case reversed flow is indicated by zero voltage level on the output of the phototransistor circuit. The pulse train representing flow of fluid can be easily separated from the signals indicating reversed flow by a simple resistor capacitor circuit.

A three wire cable is used to convey signals from phototransistor to a data processing device and also to supply power for a light source.

BRIEF DESCRIPTION OF THE DRAWING

For a better understanding of the invention, reference is made to the following detailed description to be read in conjunction with the accompanying drawings, wherein like elements in the several figures are identified by like reference numerals. In the figures:

FIG. 6 is a fragmentary radial section similar to FIG. 3 of an alternate embodiment of this invention.

DETAILED DESCRIPTION OF THE INVENTION

Figure 1:
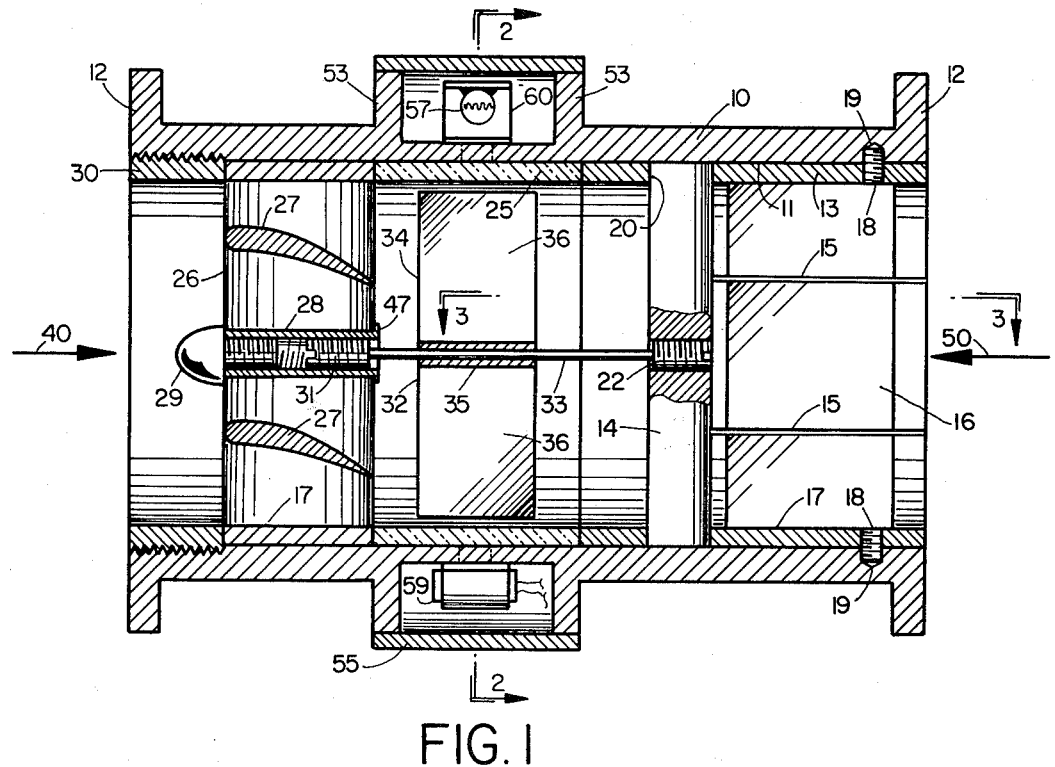
FIG. 1 is an axial section through the flowmeter.
Figure 2:
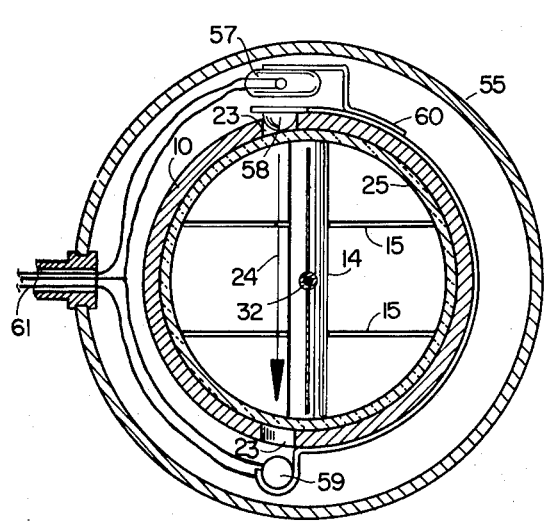
FIG. 2 is a radial section taken on the line 2—2 of FIG. 1.

Referring now to FIGS. 1 and 2, an elongated tubular body 10 preferably of noncorrosive material, has a bore 11 extending throughout the length thereof. Suitable coupling means, illustrated generally as 12 at opposite ends of the body 10 may be used for connecting the body in a pipe line or other installation where it is desired to use the flowmeter.

Inserted into the bore 11 is a sleeve 13 which is machined to receive a bearing support column 14 and a set of straightening fins extending lengthwise of the throat bore 17. Two of those fins designated by 15 are perpendicular to the bearing support column 14 and are installed symmetrically about the centerline of the throat bore 17. The fin 16 is aligned with the bearing support column 14, which is located in the center of the throat bore 17. Each of the opposite ends of the bearing support column 14 is premachined and then expanded inside of openings 20 of the sleeve 13. Mounted in a threaded hole in the center of the bearing support column 14, there is a jewel bearing 22 with springmounted VEE jewel. This type of the bearing provides minimum friction, freedom of alignment and great resistance against severe shocks and vibrations. The sleeve 13 has two holding devices, such as screws 18, projecting into a detent 19 properly located within the body 10.

Now referring to FIG. 2 in addition to FIG. 1, the body 10 has openings 23 in either side thereof which are necessary for operation of a photoelectronic pickup device. Common centerline 24 of the openings 23 is parallel to the bearing support column 14 and is offset from the center of the bore. Inserted in the bore 11 is a tube 25 which is made of clear transparent material preferably of acrylic plastic. Thus, the openings 23 are covered and prevented from affecting or disturbing the fluid flow while optical transmittance along centerline 24 through the meter body 10 is retained.

In an alternate configuration shown in FIG. 6 and bearing the same numeral designations as FIG. 2, the light beam crosses the bore in direction perpendicular to the bearing support column. Whenever the rotor is stopped, the impeller blades prevent the light beam from reaching and activating the phototransistor. It means that in this case, reversed flow is indicated by zero voltage level on the output of the phototransistor circuit.

Figure 4:
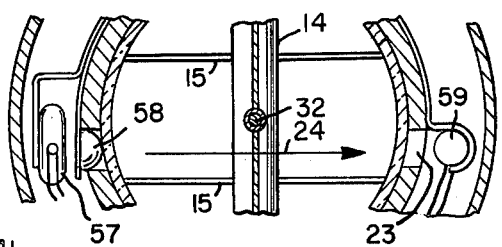
FIG. 4 is an isometric view of the stator vane.
Figure 4:
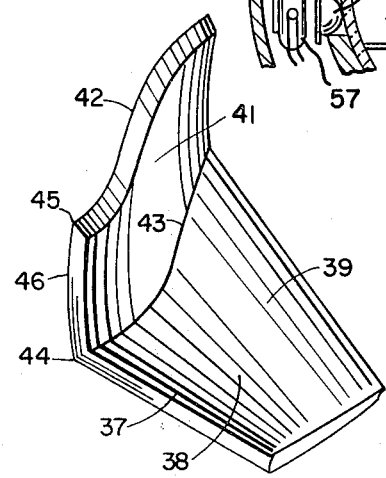

Mounted within the bore 11 is a stator assembly 26 as shown in FIG. 1 comprising a plurality of helically curved vanes 27, a hub 28 containing a jewel bearing 31 and a screw 29. The hub 28 is held in its proper position by a collar 47 and a streamlined head of the screw 29. The stator is preassembled outside of the bore 11 and then inserted therein and secured in place by a threaded retaining ring 30. Axial force developed by tightening the retaining ring is transferred by the stator assembly to the tube 25 which is opposed by the sleeve 13 fixed rigidly within the bore 11. It means, the parts 30, 26, 25 and 13 are seated tightly against each other and thus the stator assembly 26 as well as the tube 25 is secured within the bore 11. The bores of the threaded retaining ring 30, stator assembly 26, tube 25 and sleeve 13 are all of the same diameter and form a stepless throat bore 17 so as to provide for uniform flow therethrough. Mounted within the throat bore 17 is a rotor 32 comprising stainless steel shaft 33 and a low inertia impeller 34 which is made of nontransparent material. The hub portion 35 of the impeller is preferably fixed rigidly to the shaft 33 to rotate therewith. Extending radially in opposite directions from the hub portion, there are two straight blades 36 having minimum possible thickness to provide for low moment of inertia. Because of the negligible frictional torque, low moment of inertia and large active area of the impeller blades the rotor 32 runs synchronously with the fluid flow and presents negligible pressure drop. In FIG. 4, there is an isometric view of one stator vane. Effective surface of the vane consists of a leading edge 37, a transition region 38 and a skew surface 39. The leading edge 37 is oriented in direction 40 of the entering flow and has a short straight portion parallel therewith. The leading edge blends smoothly into the transition region 38 which provides a continuous change of the surface between the leading edge 37 and the skew surface 39. This skew surface is geometrically described as a ruled helicoid and its function is to direct the fluid under a proper angle into the spiral motion. A curved peripheral support 41 is an integral part of the stator vane and improves substantially rigidity thereof. Main purpose of this curved support is to provide means for a proper location and mounting of the single vanes in the meter body. A curved face 42 is equidistant to the profile 43 of the vane. In order to provide accurate spacing and tight fit of the vanes in the stator assembly the distance between points 44 and 45 measured on the circular arc 46 must be accurately maintained. As it is apparent from FIG. 5, this distance is obtained from circumference of the bore 11 by dividing it by number of vanes in the stator assembly. The vanes may be produced in required quality and at low production cost by molding from plastic material.

Figure 5:
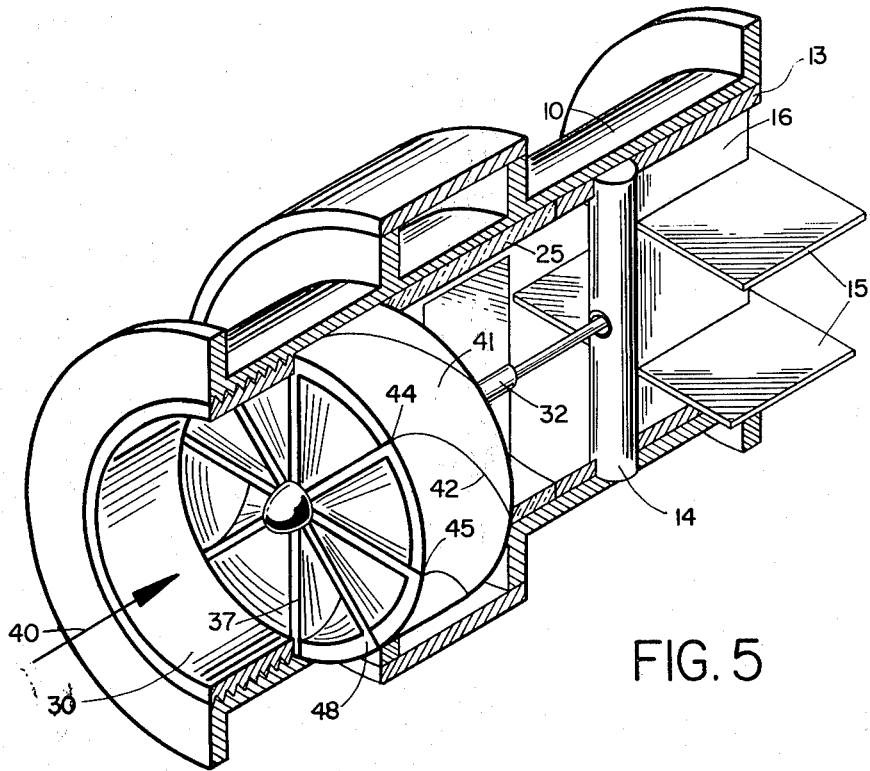
FIG. 5 is a partial longitudinal section showing the stator assembly installation in isometric projection.

In FIG. 5 is shown installation of the stator assembly in the bore 11. The curved peripheral supports mating the adjacent vanes in the stator assembly form an enclosed rim 48. This rim is of the same inside diameter as, and forms a stepless continuation of the bore of the threaded retaining ring 30 and the transparent tube 25.

Figure 3:
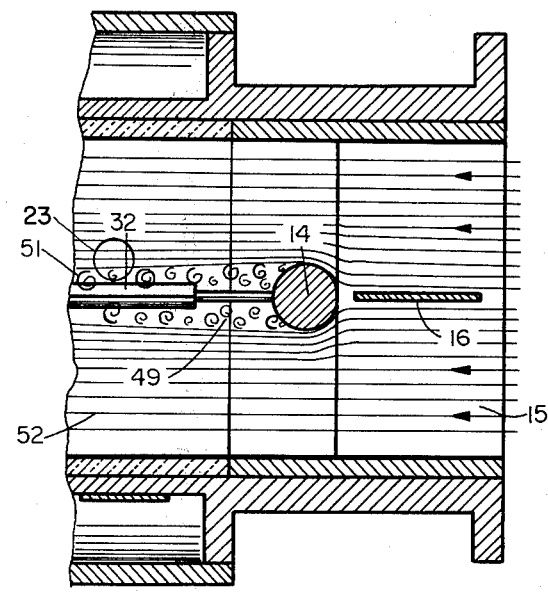
FIG. 3 is a partial axial section taken on the line 3—3 of FIG. 1, also schematically showing the wake and vortex trail forming.

In FIG. 3, is shown the rotor 32 in balanced position within a wake 49 created by the bearing support volumn 14. Reversed flow of fluid entering the flowmeter in direction 50 is directed by fins 15 and 16 axially into the bore. The flow separates from the column's surface causing eddies 51 to form. These eddies or vortices grow in size until they become too large to remain attached to the column. They then break away and are shed downstream separating the wake 49 from the surrounding flow. Light solid lines 52 indicate streamlines.

Referring now back to FIGS. 1 and 2, the body 10 has two flanges 53 and a cover 55. Located in an annular space defined by the body 10, flange 53 and cover 55, there is an electronic pickup device comprising an incandescent lamp 57, a lens 58 and a phototransistor 59. These elements being mounted on a bracket 60 are optically aligned along the line 24. Openings 23 and the transparent tube 25 allow the light which is emitted by the lamp 57 and condensed by the lens 58 to pass through bore 17. While rotating, the nontransparent impeller breaks the light beam twice per every revolution. While being stopped during reversed flow it does not interfere with the light path and allows the phototransistor to be fully illuminated. Three wire cable 61 is used to connect the pickup device to a remote signal conditioning and indicating station. While the invention has been illustrated and described in a preferred embodiment, it is recognized that variations and changes may be made therein without departing from the invention as set forth in the claims.

We claim:
1. An assembly for imparting a swirl to fluid past therethrough comprising a plurality of substantially identical elements each including rim segment portion and vane portion;
said rim segment portion including an outer surface constituting a portion of a circular tube with two edges defining inlet and outlet surfaces respectively and the remaining two edges defining surface configurations mating with the next segment edge to define an uninterrupted tubular rim;
wherein the surface configurations of said remaining two edges have portions that extend transverse to the axis of said tubular rim; and
the peripheral length of said rim segment being equal to the circumference of the assembly divided by the number of vanes;
said vane portion including the end joining said rim portion having a curve corresponding to the desired swirl deflection defining an axial hub opening;
said assembly including means axially biasing said assembly elements together to define a rigid assembly;
said biasing means comprising an encircling tubular housing, a fixed ring within said tubular housing and an axially tightenable ring embracing said stator assembly.
2. The combination in accordance with claim 1 wherein said remaining two edges have edge configurations corresponding to the profile of the vane at the rim.
3. The combination in accordance with claim 2 wherein one of said remaining two edges coincides with one side of said vane.
4. The combination in accordance with claim 3 wherein the second of said remaining two edges is a constant distance from the first of said remaining two edges.
5. An assembly for imparting a swirl to fluid past therethrough comprising a plurality of substantially identical elements each including rim segment portion and a vane portion;
said rim segment portion including an outer surface constituting a portion of a circular tube with two edges defining planar surfaces and the remaining two edges defining surface configurations mating with the next segment edge to define an uninterrupted tubular rim with planar faces;
said vane portion including the end joining said rim portion having a curve corresponding to the desired swirl deflection and a remote end generally planar;
wherein the vane portions of said assembly include;
a leading edge portion extending generally radially and including a straight section extending generally parallel to the direction of entering flow;
a skew surface constituting a ruled helicoid, and
a transition region between said leading edge portion and said skew surface providing a continuous change of surface slope therebetween.

* * * * *